United States Patent
Groche et al.

(10) Patent No.: US 10,466,120 B2
(45) Date of Patent: Nov. 5, 2019

(54) MACHINE ELEMENT WITH A SENSOR DEVICE THAT IS INSTALLED BETWEEN FIRST AND SECOND RADIALLY INWARDLY PROJECTING FORMATIONS

(71) Applicant: core sensing GmbH, Darmstadt (DE)

(72) Inventors: Peter Groche, Mühltal (DE); Martin Krech, Darmstadt (DE)

(73) Assignee: core sensing GmbH, Darmstadt (DE)

(*) Notice: Subject to any disclaimer, the term of this patent is extended or adjusted under 35 U.S.C. 154(b) by 0 days.

(21) Appl. No.: 15/571,476

(22) PCT Filed: May 3, 2016

(86) PCT No.: PCT/DE2016/000184
§ 371 (c)(1),
(2) Date: Nov. 2, 2017

(87) PCT Pub. No.: WO2016/177356
PCT Pub. Date: Nov. 10, 2016

(65) Prior Publication Data
US 2018/0128697 A1 May 10, 2018

(30) Foreign Application Priority Data
May 4, 2015 (DE) .................. 10 2015 106 933

(51) Int. Cl.
*G01L 1/22* (2006.01)
*G01L 1/16* (2006.01)
(Continued)

(52) U.S. Cl.
CPC .............. *G01L 5/0004* (2013.01); *G01L 1/16* (2013.01); *G01L 1/2225* (2013.01);
(Continued)

(58) Field of Classification Search
CPC ....... G01L 5/0004; G01L 5/167; G01L 5/168; G01L 1/2287; G01L 1/2225; G01L 1/16;
(Continued)

(56) References Cited

U.S. PATENT DOCUMENTS 3,895,689 A * 7/1975 Swearingen .......... F01D 25/168
184/6.4
9,249,820 B2 2/2016 Groche et al.
(Continued)

FOREIGN PATENT DOCUMENTS

DE 10109121 A1 9/2002
DE 10307950 10/2005
(Continued)

OTHER PUBLICATIONS

Brenneis, Matthias ; Groche, Peter, Smart components through rotary swaging., Key Engineering Materials; 504-506 pp. 723-728., 2012.
(Continued)

*Primary Examiner* — Brandi N Hopkins
(74) *Attorney, Agent, or Firm* — Smartpat PLC (57) ABSTRACT

A machine element includes a sensor device for detecting mechanical stresses affecting a hollow cylindrical shaft section. The sensor device is arranged in the hollow cylindrical shaft section positively connected with axial pretension between a first radially inwardly protruding formation and a second radially inwardly protruding formation. The machine element can be produced by first forming a first radially inwardly protruding formation in the hollow shaft section of the machine element. In a subsequent sensor arrangement step, a sensor device is fitted positively in the hollow shaft section on the first radially inwardly protruding formation. Then the second radially inwardly projecting formation is produced in the hollow shaft section in a (Continued)

subsequent joining step. Thereby, the sensor device is joined positively with an axial pretension between the first radially inwardly protruding formation and the second inwardly protruding formation.

15 Claims, 5 Drawing Sheets

(51) Int. Cl.
*G01L 5/00* (2006.01)
*G01L 5/16* (2006.01)

(52) U.S. Cl.
CPC ............ *G01L 1/2287* (2013.01); *G01L 5/167* (2013.01); *G01L 5/168* (2013.01)

(58) Field of Classification Search
CPC .. G01L 1/2218; G01L 1/00; G01L 5/24; C09J 5/00; F16B 31/025; F16B 31/02; B23P 11/025; Y10T 29/49925; Y10T 29/49865; B21K 1/44
See application file for complete search history.

(56) References Cited

U.S. PATENT DOCUMENTS

| 2002/0033092 | A1* | 3/2002 | Schafert ................... B62D 6/10 91/375 A |
| 2005/0197048 | A1* | 9/2005 | Li ......................... B24B 37/013 451/8 |
| 2009/0255214 | A1* | 10/2009 | Schussler .............. B67B 3/2086 53/331.5 |
| 2011/0037269 | A1* | 2/2011 | Poon ....................... F16C 19/52 290/55 |
| 2015/0030408 | A1† | 1/2015 | Gorche et al. |
| 2015/0330846 | A1 | 11/2015 | Norpoth |
| 2016/0001351 | A1* | 1/2016 | Gunther ............... B21D 19/046 464/183 |

FOREIGN PATENT DOCUMENTS

| DE | 102007000596 A1 | 5/2009 | |
| DE | 102009007425 | 7/2010 | |
| DE | 102010027959 A1 | 10/2011 | |
| DE | 102010040008 A1 | 3/2012 | |
| DE | 102010040017 A1 | 3/2012 | |
| DE | 102012112947 | 11/2013 | |
| DE | 102012212060 A1 | 5/2014 | |
| EP | 2527809 A1 | 11/2012 | |
| WO | 2004076257 A1 | 9/2004 | |
| WO | WO-2010089052 A1 * | 8/2010 | ............ B66F 17/003 |
| WO | 2013139464 A1 | 9/2013 | |

OTHER PUBLICATIONS

Brenneis, Matthias; Groche, Peter, Integration of Piezoceramic Tube under Prestress into a Load Carrying Structure., Advanced Materials Research, vols. 966-967 pp. 651-658, 2014.

Brenneis, Matthias; Ibis, Mesut ; Duschka, Alexander ; Groche, Peter, Towards Mass Production of Smart Products by Forming Technologies., Production Engineering, 2013.

\* cited by examiner
† cited by third party

MACHINE ELEMENT WITH A SENSOR DEVICE THAT IS INSTALLED BETWEEN FIRST AND SECOND RADIALLY INWARDLY PROJECTING FORMATIONS

TECHNICAL FIELD

The invention relates to a machine element with a hollow shaft section and a sensor device for detecting a mechanical stress affecting the hollow shaft section, the sensor device being arranged in the hollow shaft section.

BACKGROUND

Tubular or rod-shaped machine elements are used as shafts or hollow shafts, axes or rod-structures in many fields of machine and plant construction. A comprehensive and precise knowledge about the mechanical stresses acting on the machine elements during fabrication and assembly is of great interest both during the development phase of a new machine element and during its use and the entire service life of the machine element.

In order to measure the mechanical forces and moments acting on the machine element particularly in test stands and development experiments suitable sensors are fixed from the outside on a surface of the machine element and the sensor values are measured and evaluated. In many cases, strain gauges can be used to detect even minor deformations on the surface of the machine element in a cost-effective and reliable manner.

A continuous monitoring of sensor values is beneficial and sometimes required for example, in the weighing technology, load monitoring as well as in production control and production monitoring. In addition to permanent condition monitoring, sensor devices and application possibilities are also known by which structural damages such as cracks or plastic deformation can be detected at an early stage, which can lead to an impairment of the function of the machine element or damage and reduce the life and reliability of the machine element. Depending on the changes or the structural damage detected by the sensor device, it may be possible to detect an imminent failure of the machine element before a critical condition occurs.

In order to enable the most reliable and precise measurement of the mechanical stresses affecting the machine element, it is necessary to fix the sensor device on the machine element as precisely and permanently as possible. At the same time, it should be avoided that the sensor equipment is subjected to excessive stress during the measurement period, during its intended use and also during manufacture and assembly, which could lead to incorrect measurements or damage to the sensor device. At the same time, compared to a conventional machine element, the sensors should not cause any restrictions on handling and use, such as those caused by sensors mounted on an outside of the machine element or by joints that may be required for mounting sensors.

For example, it is known from EP 1 597 128 B1 that the sensor device is arranged in a cavity of a shaft to protect it from external influences and environmental conditions. The sensor device is protected in the cavity of the shaft against operational mechanical and schematic influences as well as against any willful damage. Vibration and structure-borne noise of the machine element can be recorded and evaluated with the sensor device arranged in the cavity. A permanently precise fixture of the sensor device in the cavity is not necessary, since the sensor device is not intended to measure the deformation of the cavity of the machine element.

Hollow shafts are known where a sensor device is fixed in an interior of the hollow shaft by adhesive bonding or press-fit force-locking. Although the position of the sensor device within the hollow shaft can be fixed relatively accurately, sensor devices arranged in this way are only suitable to a limited extent for the comprehensive detection of axial and radial deformations of the hollow shaft, since a reliable analysis of sensor signals usually requires that the relevant sensor or the sensor device is fixed with a preload at the measuring point. Furthermore, a significant amount of installation work is required for the arrangement and definition of the sensor equipment.

SUMMARY

It is therefore considered a task of the present invention to design a machine element of the aforementioned type in such a way, that the sensor device is arranged as protected as possible on the machine element and provides a reliable and precise measurement of mechanical load acting on the machine element over a period of time as long as possible.

This task is solved according to the invention by the fact that the hollow shaft section of the machine element has a first radially inwardly protruding formation and a second radially inwardly protruding formation and that the sensor device is positively fixed with an axial preload between the first radially inwardly protruding formation and the second radially inwardly protruding formation. The two radially inwardly protruding formations can be for example circumferential beads in a cylindrical surface that delimits an interior of the hollow shaft section. In an advantageous way the radially inwardly protruding formations have an inner diameter smaller than the adjacent areas on both sides of the hollow shaft section in axial direction. A particularly low influence and impairment of the properties of the hollow shaft section can be achieved by the fact that, for each inward protruding form, the two adjacent areas of the hollow shaft section have a matching first inner diameter and that the inwardly protruding formation formed between them has a second inner diameter which is smaller than the first inner diameter.

The radially inwardly protruding formation can have a triangular cross-sectional area with tapered or conical sides. It is also possible that the radially inwardly protruding formation has an asymmetric design of the cross-sectional area.

The inwardly protruding formations can each form one or multiple stop surfaces on which opposite faces of the sensor device can contact each other.

The sensor device is positively fixed between the two radially inwardly protruding formations so that an undesirable axial displacement of the sensor device can be excluded. In addition, by specifying a distance between the contact surfaces of the inwardly protruding formations, a contact pressure can be exerted in the axial direction on the sensor device located therebetween and an axial preload of the sensor device is thereby forced.

The axial preload can be set to a sufficiently large value, so that the sensor device is tightly fixed with sufficient torsional stability relative to the surrounding hollow shaft section to reliably detect also attacking torques and torsional loads. The axial pretension is also appropriately large enough to counteract creeping effects which might otherwise occur at the temperatures and mechanical loads which usually occur during the intended use. In addition, the pre-tensioning of the sensor device makes it possible to provide a measuring signal for appropriately selected and attached sensors, which is linearly dependent on the deformation to be measured over a wide range and facilitates precise evaluation.

According to an advantageous design of the inventive idea it is intended that the first radially inwardly protruding formation and/or the second radially inwardly protruding formation have a stop surface inclined at an angle to a center axis of the hollow shaft section. The stop face can have an angle or an inclination of the stop face between 20 and 30 degrees, for example. The radially inwardly protruding formations can be produced simply and inexpensively with an angled stop surface. In addition, the desired pre-tensioning of the sensor device can be maintained over a long period of time with low error tolerances by means of an inclined stop surface.

In the case of rotationally symmetrically designed machine elements and, in particular, in the case of machine elements that rotate according to their intended purpose, it is advisable that the first radially inwardly protruding formation and/or the second radially inwardly protruding formation have a constant cross-sectional area in the circumferential direction. In this way, the risk of an unwanted unbalance during the intended rotation of the machine element can be reduced by a constant or rotationally symmetrical shaping of the formations. In addition, the fact that the cross-sectional area of the inwardly protruding formation remains constant in the circumferential direction favors the alignment of the sensor device along a central axis and considerably reduces the risk of undesired shear force components, which could act on the sensor device in the radial direction.

In order to fix the sensor device within the hollow-shaft section as torque-proof as possible, it is intended that a stop surface of the first radially inwardly protruding formation and/or a stop surface of the second radially inwardly protruding formation has a profiled surface in the peripheral direction which forms an engagement with the sensor device. The surface, that is profiled in the peripheral direction can, for example, have a wavy or tooth-shaped patterning. It is likewise conceivable for the surface to have grooves or beads extending in the axial direction. The surface may also be roughened or provided with a sufficiently uneven or rough coating.

Depending on the predefined profiling of this surface an engagement between the sensor device and the profiled surface is formed after the insertion and fixing of the sensor device with a high force-fit and where applicable also a form-fit. Through this engagement, the sensor device is fixed torque-proof in the hollow shaft section so that even a high torque can be reliably detected.

In order to facilitate the insertion and the reliable positioning of the sensor device between the inwardly protruding formations, it is provided that the sensor device has a first end face and/or a second end face with a circumferential edge zone and with a chamfer formed in the edge zone.

In order to reinforce and encourage the engagement between the sensor device and the inwardly protruding formations it is provided that the sensor device has a first end face and/or a second end face with a circumferential edge zone with a shaping which is profiled in the peripheral direction and which forms an engagement with the first radially inwardly protruding formation or the second radially inwardly protruding formation. The profiled shaping in peripheral direction in the edge zone of the end faces of the sensor device is expediently adapted to the surface profile of the stop surfaces of the inwardly protruding formations. In this way, a reliable and extremely torque-proof fastening of the sensor device in the hollow shaft section can be carried out with little effort. The profiling in peripheral direction can be combined with a chamfer, which is also circumferential. By means of such a positive engagement in peripheral direction, it can be achieved that the sensor device is fixed torque-proof in the hollow shaft section, and torques and deformations caused by torsion can be reliably and precisely detected with the sensor device. An undesirable twisting of the sensor device relative to the surrounding hollow shaft section occurs only when the forces and torques acting from the outside force a plastic deformation of the positive engagement between the sensor device and the adjacent radially inwardly protruding formations or destroy the positive engagement.

It is advantageous that the sensor device has a shaping of the circumferential edge zone of a first end face and/or second end face of the sensor device which is adapted to a shaping of the first or second radially inwardly protruding formation. In this way, the largest possible contact area can be made possible and it is achieved, that the sensor device contacts the corresponding stop surfaces of these formations over a large area even with only slightly inwardly protruding formations.

According to an advantageous design of the inventive idea it is intended that the sensor device has at least one deformation sensor. Suitable deformation sensors are, for example, strain gauge arrangements or piezo sensors or quartz plate sensors, which can be used to carry out very low-cost and precise measurements of the deformation of the hollow shaft section produced by mechanical stress. As a result of the pretension of the sensor device generated in axial direction, the respective deformation sensors used can be operated with a corresponding pretension, and thus not only detect moments reliably but also tensile and compressive forces acting in the axial direction. In addition, numerous deformation sensors, which can be set under pretension at the respective measuring location, exhibit a linear and thus permanently precise evaluation of the generated sensor signals over a wide measuring range, depending on the causing deformation.

An arrangement of several piezoelectric elementary sensors connected in series, such as a combination of several quartz crystals with different cutting planes, allows the detection of several differently directed components of acting forces and moments and also offers the advantage that a complex bonding of other elementary sensors such as strain gauges is not necessary.

For numerous applications it is advisable that the machine element is a shaft. The hollow shaft section can also extend in the axial direction essentially over the entire shaft so that the machine element is a hollow shaft. It is also possible for the hollow shaft section to have only a short extent in the axial direction, which is adapted to the dimensions of the sensor device to be accommodated therein, so that only a minimal mechanical influence of a solid shaft or of a solid machine element occurs. The machine element may also be an axis or a rod-shaped component of a rod structure in a machine or system.

The invention also relates to a method for producing a machine element with a hollow shaft section and a sensor device for measuring mechanical stress affecting the hollow shaft section. According to the invention, in a first forming step, a first radially inwardly protruding formation is produced in the hollow shaft section of the machine element. In a subsequent sensor arrangement step, a sensor device is positively fitted in the hollow shaft section on the first radially inwardly protruding formation. In a subsequent joining step, a second radially inwardly protruding formation is produced in the hollow shaft section, by means of which the sensor device is positively fixed with an axial pretension between the first radially inwardly protruding formation and the second radially inwardly protruding formation.

During the first forming step, a forming process can be carried out to reduce the diameter of the hollow shaft section. The arrangement and fixation of the sensor device is therefore integrated into the manufacturing process of the machine element according to the invention, which is possible with little additional effort. In this case, a continuous detection and evaluation of sensor signals can take place already during the insertion of the sensor device into the hollow shaft section and in particular during the development of the second radially inwardly protruding formation, by means of which the axial pretension of the sensor device is generated and the sensor device is fixed in the hollow shaft section. As a result, both the desired pretension of the sensor device can be determined reliably and a functional and suitable fixation of the sensor device in the hollow shaft section can be checked.

The production of the machine element can be carried out particularly cost-effectively and simply producing the first radially inwardly protruding formation and the second radially inwardly protruding formation by a cold forming process. For this purpose, it is only necessary for the machine element to be made of a material which is suitable for cold forming in the region of the radially inwardly protruding formation. Since the machine element can or should be made of metal for numerous purposes and fields of application, the innovative manufacturing process for such machine elements can be used in an advantageous way in combination with cold forming.

According to a particularly advantageous design of the inventive idea, it is intended that the radially inwardly protruding formations are produced by rotary swaging. At least the hollow shaft section and, if appropriate, the entire machine element is expediently transferred from a blank to the desired shape by rotary swaging. For a particularly simple integration of the sensor device, prefabricated blank shaping is suitable, which has outer and inner contour profiles adapted to the production method. For this purpose, a mandrel inserted into the cavity can be used which has a suitable design and shaping of an end section and, depending on its positioning within the hollow shaft section, influences or predetermines the shaping of a radially inwardly protruding formation forced by the rotary swaging process.

In order to produce a suitable profiling of the stop surface surfaces of the inwardly protruding formations as inexpensively as possible, it is expediently planned that a mandrel inserted in the hollow shaft section is used to generate the first and/or second radially inwardly protruding formation in the peripheral direction. For this purpose, the mandrel has a profiling in its end zone which is a negative form of the desired profiling of the inwardly protruding formations. During the cold forming of the machine element, some material of the blank or of the machine element flows into the negative form defined by the end zone of the mandrel, whereby a corresponding profiling of the radially inwardly protruding formations is produced. After removing the mandrel from the hollow shaft section, the predefined surface profile remains in place.

BRIEF DESCRIPTION OF THE DRAWINGS

The following examples of the inventive step illustrated in the drawing are explained in more detail below. It shows.

DETAILED DESCRIPTION

In FIGS. 1 to 4, different steps within the inventive manufacturing process are shown as examples, with which a one-piece hollow shaft 1 with a pre-tensioned sensor device 2 fixed therein is produced.

Figure 1:
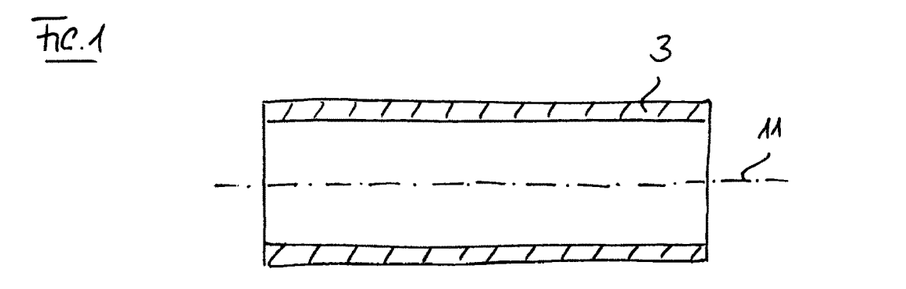
FIGS. 1 to 4 a schematic representation of a process sequence during the production of a hollow shaft with a sensor device arranged therein, FIG. 5 a schematic representation of a machine tool for rotary swaging during processing of a hollow shaft section, FIG. 6 an exploded view of a mandrel and a hollow-shaft section with a produced profiling using the mandrel during the manufacturing process according to the invention of the hollow shaft section, with the sensor device arranged therein, FIG. 7 a schematic representation of a hollow shaft with a sensor device arranged therein, as well as an amplifier and transmission device, FIG. 8 a schematic and partially sectioned representation of a sensor assembly with multiple deformation sensors in a radially recessed belt area, FIGS. 9 and 10 each a schematic representation of various possibilities for generating a form-fit between the sensor device and the surrounding hollow shaft section, which is formed in the circumferential direction, FIG. 11 a schematic representation of a portion of the sensor device, which is fixed positively in the peripheral direction in a surrounding region of the hollow shaft section, and FIG. 12 a schematic representation of a different sensor arrangement having a sensor arrangement comprising a plurality of piezoelectrically contacted quartz disks, wherein the sensor arrangement is arranged in a shaft with a hollow shaft section limited in axial direction.

A tubular blank 3, as shown in FIG. 1, can be used for the production. A mandrel 4 is inserted into the tubular blank 3, which has a first section 5 with a slightly smaller radius and a second section 6 with a slightly larger radius. The respective end zones of the two sections 5 and 6 each have a chamfer 7 and 8 profiled in circumferential direction. The length of the first section 5 and the distance between the two chamfers 7 and 8 correspond approximately to the length of the sensor device 2 in the axial direction, whereby the sensor device 2 is expediently slightly longer.

Figure 2:
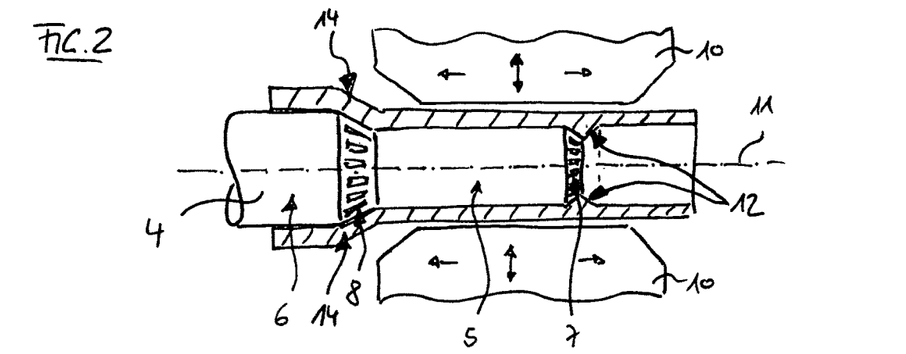
Figure 5:
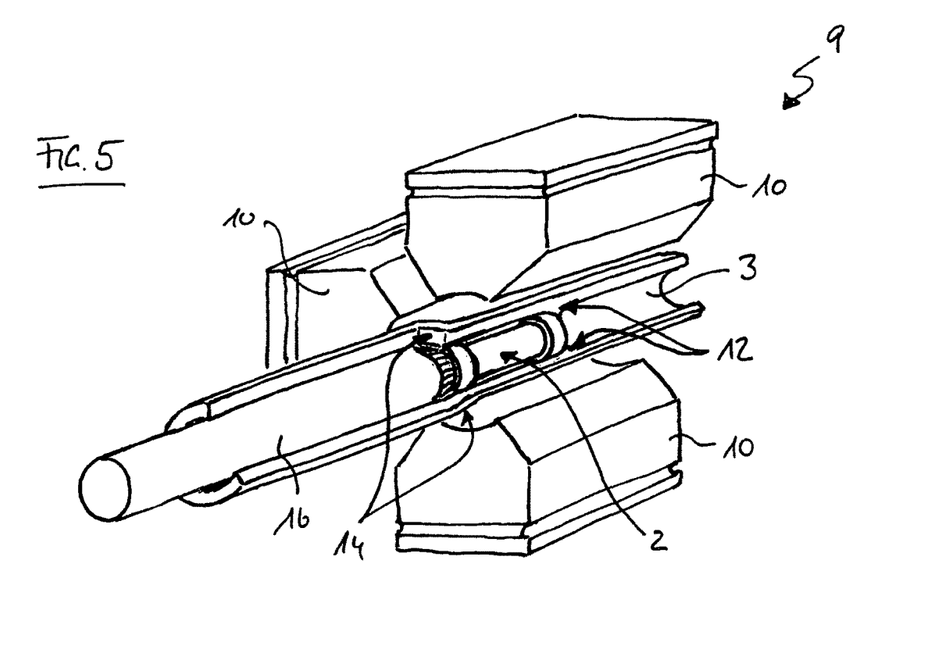

With an appropriate machine tool 9 which is shown exemplary in FIG. 5, a first section of the blank 3, which is located on the right in FIG. 2, is reduced regarding the circumference by rotary swaging so that an outer circumference already corresponds to the desired shaping of the hollow shaft 1. With a suitable relative movement of the individual rotary swaging tools 10, which act oscillatingly on the blank 3 while the blank 3 is displaced relative to the machine tool 9 along its center axis 11, an inwardly protruding ring-shaped formation 12 is produced at a front end of the mandrel 4. The material of the blank 3, flowing in the inner region, flows onto the profiled chamfer 7 of the mandrel 4, which acts as a negative form and produces a corresponding profiling of an inclined contact surface 13 of the inwardly protruding formation 12. The inclination angle $\alpha$ of the contact surface 13 relative to the center axis 11 is approximately 21°.

By machining the blank 3 with the machine tool 9, a conically tapered region 14 of the blank 3 is produced in the region of the chamfer 8 of the mandrel 4. This region 14 also has a profiling in the peripheral direction which is adapted to the profiling of chamfer 8 and is thus pre-determined.

Figure 3:
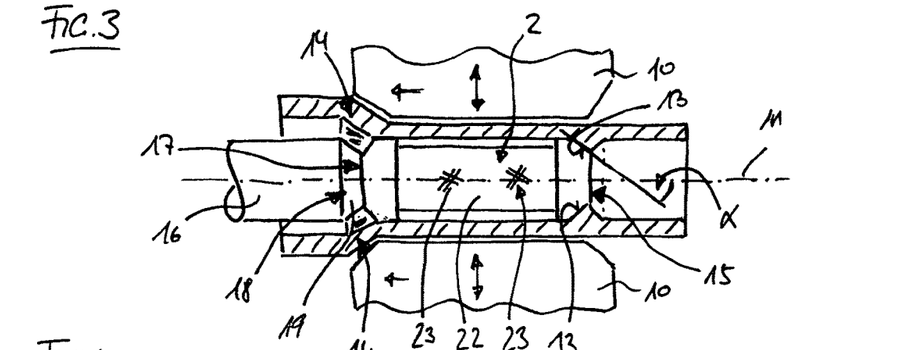

Subsequently, the mandrel 4 is pulled out and the sensor device 2 is inserted into the blank 3 until a first end face 15 of the sensor device 2 touches the inwardly protruding formation 12. Afterwards a second mandrel 16 is inserted into the blank 3 and pressed against a second end face 17 of the sensor device 2 so that the sensor device 2 is under axial pre-tension. The second mandrel 16 has a diameter which corresponds to the diameter of the first section 5 of the mandrel 4. On the front end 18 facing the sensor device 2, the mandrel 16 also has a chamfer 19, as shown in FIG. 3. Instead of the second mandrel 16, the first mandrel 4 could also be reinserted and pressed against the second end face 17 of the sensor device 2.

Figure 4:
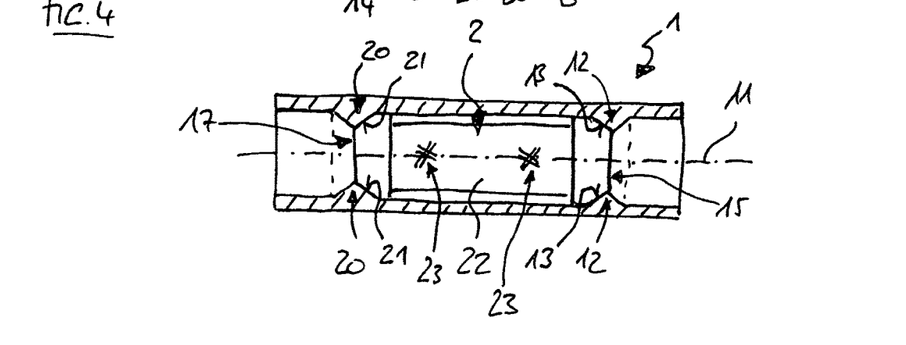

The blank 3 with the sensor device 2 arranged therein is displaced relative to the machine tool 9 together with the mandrel 16, while the blank 3 is transferred to its final form of the hollow shaft 1 by the oscillating rotary swaging tools 10 over the initially conically tapered region 14. A second inwardly protruding formation 20 is formed, of which the shaping is predetermined by the second end face 17 of the sensor device 2 and the chamfer 19 of the mandrel 16. A contact surface 21 of the inwardly protruding formation 20 facing the sensor device 2 mostly retains the profiling of the conically tapered region 14, which is transferred into the second inwardly protruding formation 20. The sensor device 2 is fixed in the axial direction positively between the first inwardly protruding formation 12 and the newly formed second inwardly protruding formation 20 under the preload defined by the mandrel 16, whereby a fitting of the conically tapered region 14 to the second end face 17 leads to an additional axially directed force component or pretension in the sensor device 2. The finished hollow shaft 1 with the sensor device 2 fixed therein is illustrated in FIG. 4. As a result of the forming process and the material flow thereby forced, the sensor device 2 is constrained and compressed in the axial direction so that the pre-tension is produced or maintained during the diameter-reducing forming process.

The inclination angle α of the first radially inwardly protruding formation 12 can also be predetermined differently, since the contact surface 13 can be designed exclusively with the objective of a reliable form fit. On the other hand, the inclination angle α at the contact surface 21 of the second inwardly protruding formation 20 is also important with regard to the desired material flow during the forming process and for the generation of a transverse force acting in the axial direction during the radially acting rotary swaging process and should therefore expediently lie within a region between 20° and 30°.

As a result of the previously formed profiling in the peripheral direction of the tapering region 14 and by a corresponding profiling of the first inwardly protruding formation 12, a positive engagement in the peripheral direction is simultaneously produced and the sensor device 2 is torque-proof fixed between the two inwardly protruding formations 12 and 20 in an interior space of the hollow shaft 1.

The sensor device 2 has a suitable sensor carrier 22 on which several deformation sensors 23 are fixated. The sensor values measured with the deformation sensors 23 can, for example, be transmitted wirelessly to an evaluation device.

Figure 6:
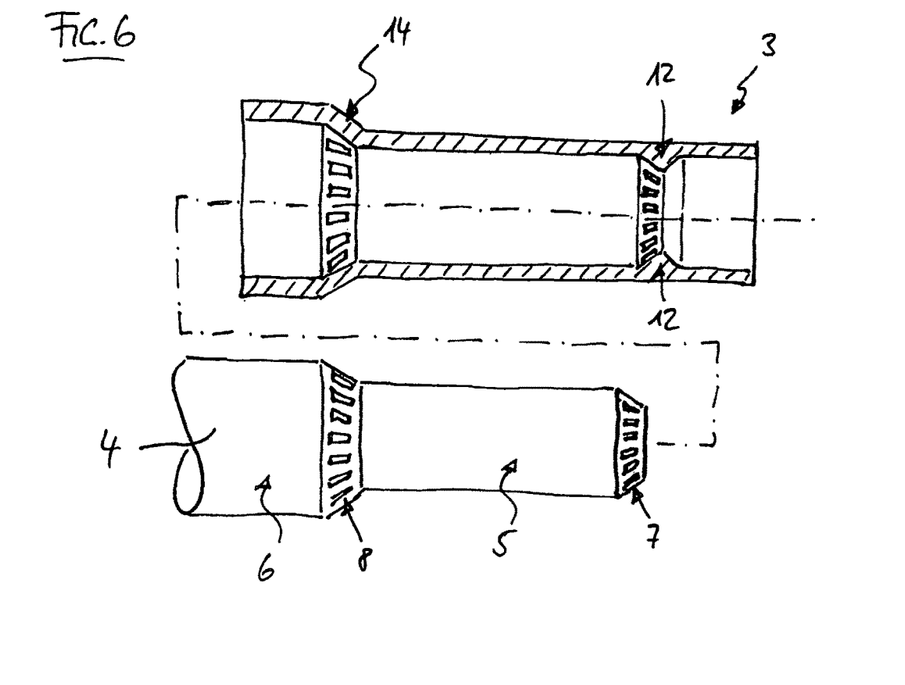

In FIG. 6, the mandrel 4 and the blank 3 are shown in an exploded view by way of illustration after the manufacturing step shown in FIG. 2. The profiling of the chamfers 7 and 8 of the mandrel 4 produce a correspondingly adjusted profiling of the contact surfaces 13 and 21, between which the sensor device 2 is fixed by a form-fit in a torque-proof manner and pre-stressed in axial direction.

Figure 7:
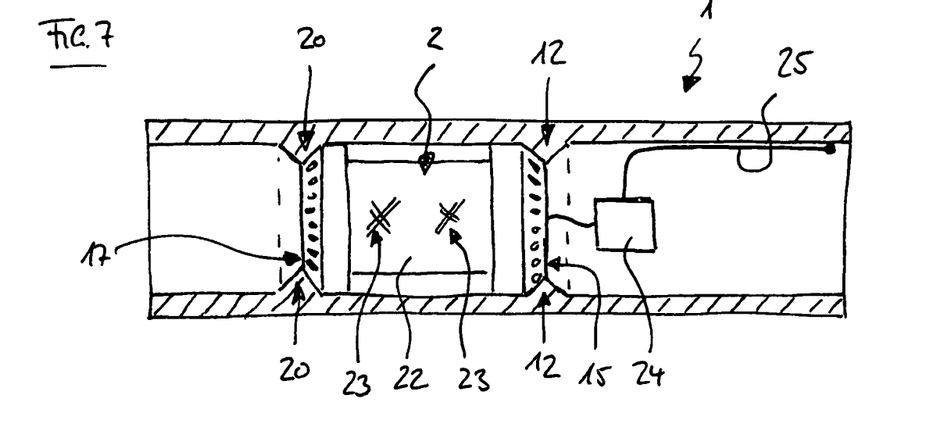

FIG. 7 shows by way of example the sensor device 2 fixed in the hollow shaft 1 between the two radially inwardly protruding formations 12 and 20 together with an amplifier and transmission device 24 as well as an antenna 25 for the wireless transmission of the sensor values to an external evaluation device (not shown). The amplifier and transmission device 24 is arranged directly adjacent to the sensor device 2 in the hollow shaft 1 and is electrically connected to the deformation sensors 23 on the sensor carrier 22 through the end face 15.

Figure 8:
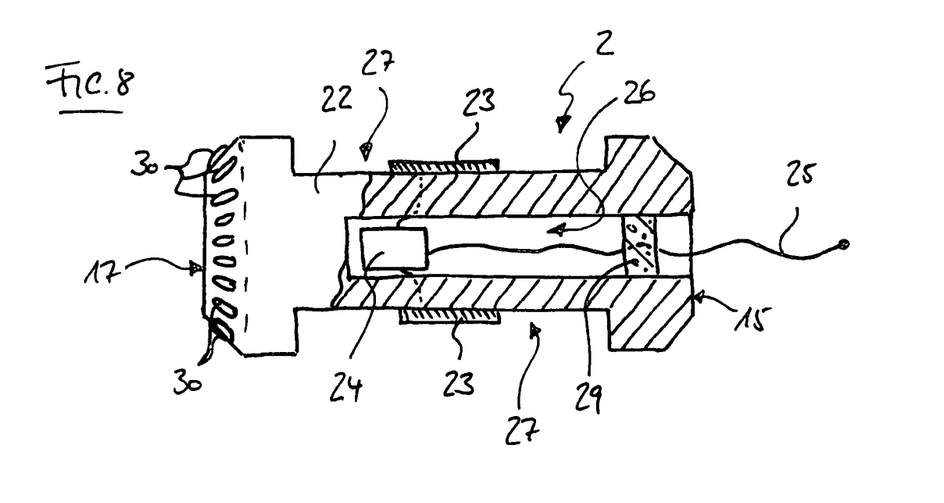

FIG. 8 illustrates an alternative design of the sensor device 2 in which the amplifying and transmitting device 24 is inside a cavity 26 in the interior of the sensor carrier 22. The deformation sensors 23, which are adhered to an outer peripheral surface 28 in a radially recessed belt region 27 of the sensor carrier 22, are electrically connected to the amplifier and transmission device 24. The antenna 25 is led out of the sensor carrier 22 in the axial direction through a seal 29.

In order to enable a reliable form fit in the peripheral direction with the surrounding hollow shaft 1 or with the contact surfaces 13 and 21 of the radially inwardly protruding formations 12 and 20, the sensor device 2 has a number of tooth-shaped or nose-shaped formations 30 respectively on both end faces 15 and 17.

The profiling of the contact surfaces 13 and 21 as well as the formation of tooth-shaped or nose-shaped formations 30 in the region of the end faces 15 and 17 of the sensor device 2 can be produced in various ways.

Figure 9:
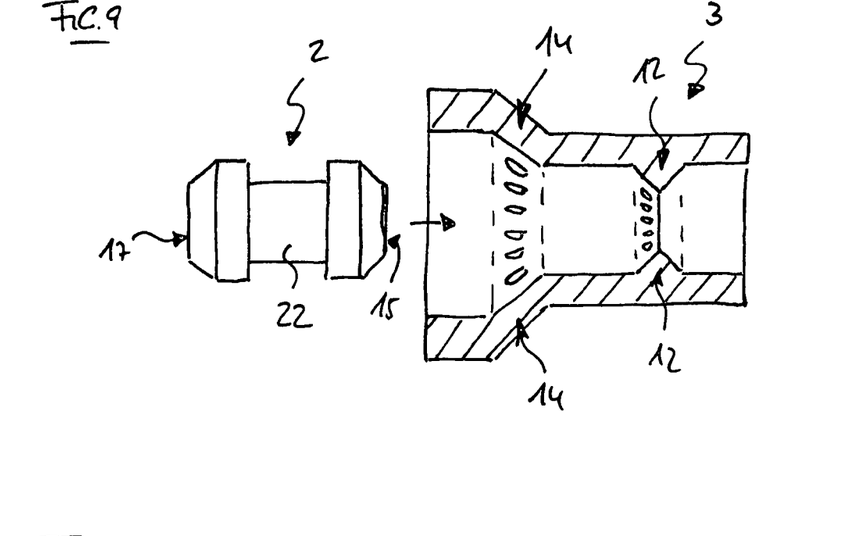

In the design example shown schematically in FIG. 9, a suitable profiling of chamfers 7 and 8 of the mandrel 4 arranged on the inside of blank 3 is used to determine an appropriate profiling of the contact surface 13 and the tapered area 14, which is then forced upon it. The two end faces 15 and 17 of the subsequently inserted sensor device 2 consist of a less hard material than the blank 3, so that its profiling is maintained during an axial press-in operation of the sensor device 2 and a subsequent shaping of the tapering region 14 and a suitable profiling of the end faces 15 and 17 of the sensor device 2 is forced.

Figure 10:
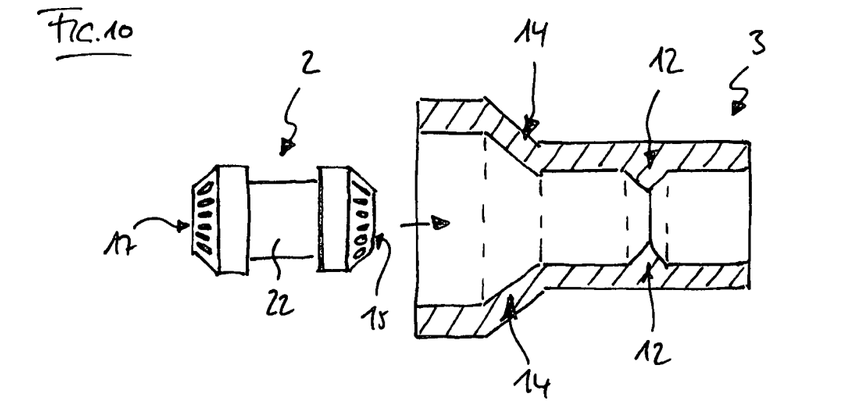

In the exemplary design example shown in FIG. 10 the profiling on the end faces 15 and 17 of the sensor device 2 is given and transferred to the contact surfaces 13 and 21 of the radially inwardly protruding formations 12 and 20.

Figure 11:
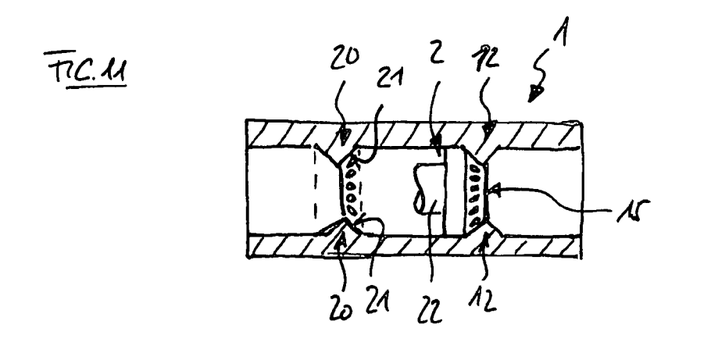

In both cases, a positive fit as shown in FIG. 11 is achieved, which exists in the circumferential direction between the end faces 15 and 17 and the respectively assigned contact surfaces 13 and 21 and prevents an undesirable twisting of the sensor device 2 relative to the surrounding hollow shaft 1. For the sake of illustration, only a partial region of the sensor device 2 in the illustration on the right is shown in FIG. 11. The profiling given in circumferential direction is located both on the right-hand face 15 of the sensor device 2 and on the left-hand contact surface 21 of the radially protruding shape 20, so that a form-fit intervention between sensor device 2 and the hollow shaft 1 is given, which originates respectively from both surfaces.

Figure 12:
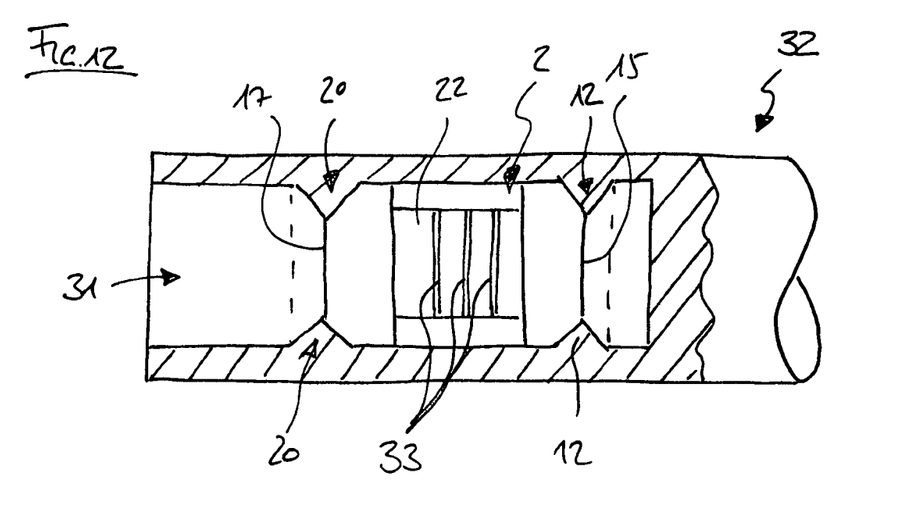

In the design example shown schematically in FIG. 12, the sensor device 2 is arranged in a blind hole 31 in a shaft 32. The sensor device 2 has a plurality of piezoelectric quartz plates 33 with different cutting direction planes connected in series and arranged in a row in the axial direction.

The invention claimed is:

1. A machine element, comprising:
   a one-piece hollow cylindrical shaft section; and
   a sensor device for detecting a mechanical stress affecting the hollow cylindrical shaft section,
   wherein the sensor device comprises a sensor carrier and at least one deformation sensor fixed on the sensor carrier,
   wherein the sensor device is arranged in the hollow cylindrical shaft section,
   wherein the hollow cylindrical shaft section has a first radially inwardly protruding annular formation and a second radially inwardly protruding annular formation, and
   wherein the sensor device is positively connected with an axial pretension between the first radially inwardly protruding annular formation and the second radially inwardly protruding annular formation.

2. The machine element according to claim 1,
   wherein the first radially inwardly protruding annular formation and/or the second radially inwardly protruding annular formation has a stop surface inclined at an angle to a central axis of the hollow cylindrical shaft section.

3. The machine element according to claim 1,
   wherein the first radially inwardly protruding annular formation and/or the second radially inwardly protruding annular formation have a constant cross-sectional area in peripheral direction.

4. The machine element according to claim 1,
   wherein a stop surface of the first radially inwardly protruding annular formation and/or a stop surface of the second radially inwardly protruding annular formation has a profiled surface in peripheral direction which forms an engagement with the sensor device.

5. The machine element according to claim 1,
   wherein the sensor device has a first end face and/or a second end face with a circumferential edge zone with a profiled shaping in the peripheral direction, which forms an engagement with the first radially inwardly protruding annular formation or with the second radially inwardly protruding annular formation.

6. The machine element according to claim 5,
   wherein the circumferential edge zone of the first end face and/or the second end face with a profiled shaping in the peripheral direction forms a contact surface inclined at an angle to the central axis and
   wherein the axial pre-tension of the sensor device is predetermined by the inclined contact surface.

7. The machine element according to claim 1,
   wherein the sensor device has a shaping of a first end face and/or a second end face of the sensor device adapted to a shaping of the first or second radially inwardly protruding annular formation.

8. The machine element according to claim 1, wherein the at least one deformation sensor is a strain gauge, piezo sensors or quartz plate sensor.

9. The machine element according to claim 1,
   wherein the one-piece hollow cylindrical shaft section forms a portion of a shaft or a hollow shaft.

10. A method for manufacturing a machine element having a hollow cylindrical shaft section and a sensor device arranged therein for measuring mechanical stress affecting the hollow cylindrical shaft section, wherein
    in a first forming step a first radially inwardly protruding annular formation is formed in the hollow cylindrical shaft section of the machine element, wherein
    in a subsequent sensor arrangement step a sensor device is positively fitted in the hollow cylindrical shaft section on the first radially inwardly protruding annular formation, and wherein,
    in a subsequent joining step, a second radially inwardly protruding annular formation is formed in the hollow cylindrical shaft section by which the sensor device is positively connected with an axial pretension between the first radially inwardly protruding annular formation and the second radially inwardly protruding annular formation.

11. The method according to claim 10,
    wherein the first radially inwardly protruding annular formation and the second radially inwardly protruding annular formation are produced by cold forming.

12. The method according to claim 11,
    wherein the radially inwardly protruding annular formations are produced by rotary swaging.

13. The method according to claim 10,
    wherein a profiled shaping in the peripheral direction of the first and/or the second radially inwardly protruding annular formation is predefined by a mandrel inserted into the hollow shaft section.

14. The method according to claim 10,
    wherein a profiled shaping in the peripheral direction of the first and/or the second radially inwardly protruding annular formation is predefined by the profiled end faces of the sensor device.

15. A machine element, comprising:
    a hollow cylindrical shaft section formed within the machine element;
    a first radially inwardly protruding annular formation formed within the hollow cylindrical shaft section;
    a second radially inwardly protruding annular formation formed within the hollow cylindrical shaft section; and
    a deformation sensor fixed on a sensor carrier arranged between the first radially inwardly protruding annular formation and the second radially inwardly protruding annular formation in the hollow cylindrical shaft section,
    wherein the sensor carrier is positively connected with an axial pretension between the first radially inwardly protruding annular formation and the second radially inwardly protruding annular formation, and
    wherein the hollow cylindrical shaft section within the machine element is formed as a single piece.

* * * * *